United States Patent [19]
Varnham et al.

[11] Patent Number: 5,218,867
[45] Date of Patent: Jun. 15, 1993

[54] SINGLE AXIS ATTITUDE SENSOR

[75] Inventors: Malcolm P. Varnham; Diana Hodgins; Timothy S. Norris; Hugh D. Thomas; Charles Day, all of Herts, England

[73] Assignee: British Aerospace Public Limited Company, London, England

[21] Appl. No.: 873,222

[22] Filed: Apr. 24, 1992

Related U.S. Application Data

[63] Continuation of Ser. No. 558,337, Jul. 27, 1990, abandoned.

[30] Foreign Application Priority Data

Jul. 29, 1989 [GB] United Kingdom ............... 8917223

[51] Int. Cl.⁵ .......................................... G01P 15/125
[52] U.S. Cl. ...................................................... 73/505
[58] Field of Search ........................................ 73/505

[56] References Cited

U.S. PATENT DOCUMENTS

| 4,079,630 | 3/1978 | Friedland et al. | 73/505 |
| 4,157,041 | 6/1979 | Loper, Jr. et al. | 73/505 |
| 4,793,195 | 12/1988 | Koning | 73/505 |
| 4,951,508 | 8/1990 | Loper, Jr. et al. | 73/505 |

FOREIGN PATENT DOCUMENTS

| 0153189 | 8/1985 | European Pat. Off. |  |
| 1298343 | 6/1962 | France | 73/505 |

OTHER PUBLICATIONS

Langdon, R. M., "The Vibrating Cylinder Gyro," Marconi Review, 645, vol. 45 (1982) No. 227, Great Britain, pp. 231–249.

Primary Examiner—Hezron E. Williams
Assistant Examiner—Rose M. Finley
Attorney, Agent, or Firm—Cushman, Darby & Cushman

[57] ABSTRACT

This invention relates to a single axis solid state attitude sensor in which, the spatial orientation of a resonant rode on a resonant body is maintained in alignment with the inertial angle K8 of the resonant body.

19 Claims, 5 Drawing Sheets 5,218,867

SINGLE AXIS ATTITUDE SENSOR

This is a continuation of application Ser. No. 07/558,337, filed Jul. 27, 1990, now abandoned.

BACKGROUND OF THE INVENTION

This invention relates to an attitude sensor, in particular a single axis solid state attitude sensor which may be rotated about its sensitive axis.

In a single axis attitude sensor, it is known to set a closed-end cylinder into a mode of vibration by applying an oscillatory signal to primary actuator(s) positioned around the side walls of the cylinder as is shown in FIG. 1. For example, the (primary) mode that is excited in the cylinder has a radial amplitude of $\cos 2\theta \cos wt$ (where $w$ = the resonant frequency of the $\cos 2\theta$ mode) and the mode vibrates as shown in FIG. 2. In practice, it is necessary to derive a signal from the cylinder by means of an appropriate primary pick-off whose amplitude is dependant upon the amplitude of the mode. This derived signal can be fed back to the oscillator to adjust the oscillator output thus ensuring that the cylinder is maintained at the desired resonance (mode of vibration).

When the cylinder is rotated about its axis, the direction of the vibrating mode lags behind the cylinder, by an amount that corresponds to the excitation of a (secondary) mode whose radial dependence is $\sin 2\theta \cos wt$. The amplitude of this mode can be measured using appropriate secondary pick-off(s). The resulting signal when demodulated with respect to the oscillator output, can be used as a measurement of the rotation rate that is applied to the cylinder.

The pick-off signal which measures the amplitude of the $\sin 2\theta \cos wt$ can also be used as shown in FIG. 3. Here the signal is amplified and fed back to secondary actuator(s) positioned around the cylinder to null the amplitude of the $\sin 2\theta \cos wt$ mode to approximately zero.

The amplitude of the signal fed back to the actuator is dependant upon the rotation rate applied to the cylinder and thus if the signal is demodulated with respect to the oscillator signal, the output of the demodulation is a measurement of the rotation rate. The measurement of rotation rate obtained through feedback, in general, can be expected to be a more linear measurement of rotation rate than that obtained without feedback.

It is known to construct the cylinder of various materials, such as fused silica, Beryllium-Copper, PZT etc. Various drive and pick-off mechanisms have been proposed including, for example, piezo-electric, magnetic, electrostatic, thermal or resistive thermal devices. Other shaped resonators are known such as discs, open-ended cylinders, hemispheres, and other shells with azimuthal symmetry. Castellations have also been incorporated into some designs.

However, these designs all suffer from a common drawback, namely that a scale factor of the rate sensor is dependent upon the Q factor of the cylinder, the efficiency of the actuator, and the gain of the demodulators. Thus the scale factor is not constant as one would ideally require. Whilst feedback of the primary pick-off signal to the primary actuator can stabilise the amplitude of the primary mode, this solution does not eliminate the scale factor problem.

One reason why the scale factor accuracy problem is so important, can be understood by examining the following system. A rate sensor output is connected to an integrator whose output is the angle through which the cylinder is turned about its axis—ie, the system is a single-axis attitude sensor (or rate integrating gyroscope). If there is a 1% scale factor error, then the output will be in error by 3.6° for each revolution of the cylinder no matter how fast the cylinder is turned. This error will be additive to the other errors arising from drifts and nonlinearity.

A conventional solution to the scale factor problem would be to place the rate sensor on a rotating platform and to use the output of the rate sensor to drive a motor such that the cylinder does not rotate when the system is moved. This solution would work, but would not have the advantages in reliability and manufacturability offered by the solid-state solution proposed by this invention.

SUMMARY OF THE INVENTION

The object of the present invention is to overcome the drawbacks of the devices discussed above, and provide a reliable and easily manufacturable solid state attitude sensor.

According to a first aspect of the present invention there is provided a solid-state attitude sensor having a resonant body; at least two actuators coupled to the body at a first predetermined set of positions for causing the body to resonate at a predetermined angle relative to the actuators; at least two pick-offs for producing a signal indicative of the resonance of the body; the pick-offs positioned around the body at a second predetermined set of positions; signal processing means for determining a rate and attitude of the sensor from said signal; and feedback means for causing said actuators to varying said predetermined angle according to the attitude of the sensor.

According to a second aspect of the present invention there is provided a solid-state attitude sensor having a resonant cylinder; at least two actuators coupled to the cylinder at two positions thereon; drive means for driving the actuators to resonate the cylinder; pick-off means coupled to the cylinder for producing an electrical signal indicative of its resonant behaviour; signal processing means for controlling the resonant behavior of the cylinder, the signal processing means having a demodulating means for determining a rate and a change in attitude of said sensor from said electrical signal and producing a demodulated signal; amplifying means for amplifying the demodulated signal; and integrating means connected between the demodulating means and the actuator means for regulating the drive means based on said amplified demodulated signal.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
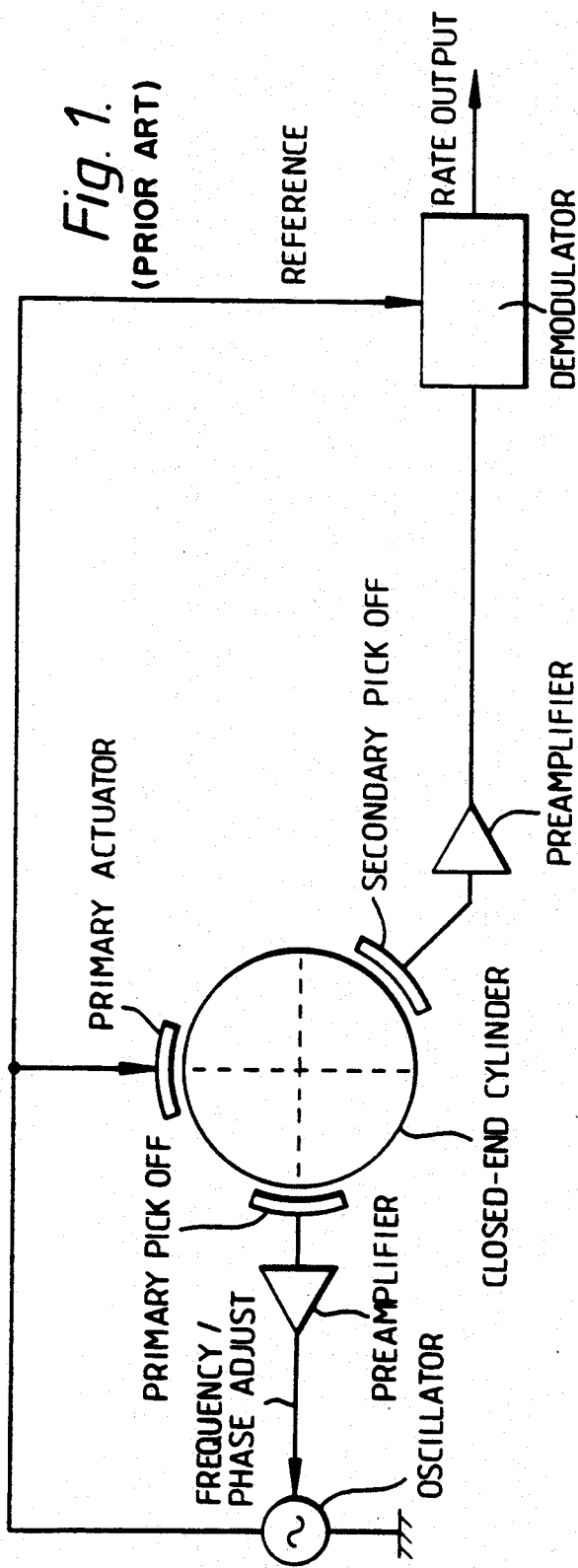
FIG. 1 is a top view of a known closed end cylinder which is used a rate sensor.
Figure 2:
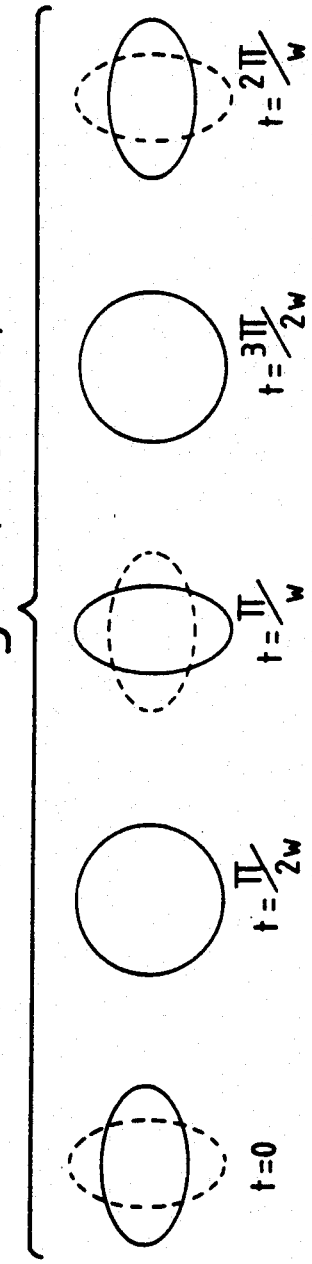
FIG. 2 is a top view for showing the mode amplitude as a function of time of the $\cos 2\theta \cos wt$ mode vibration of the FIG. 1 cylinder.
Figure 3:
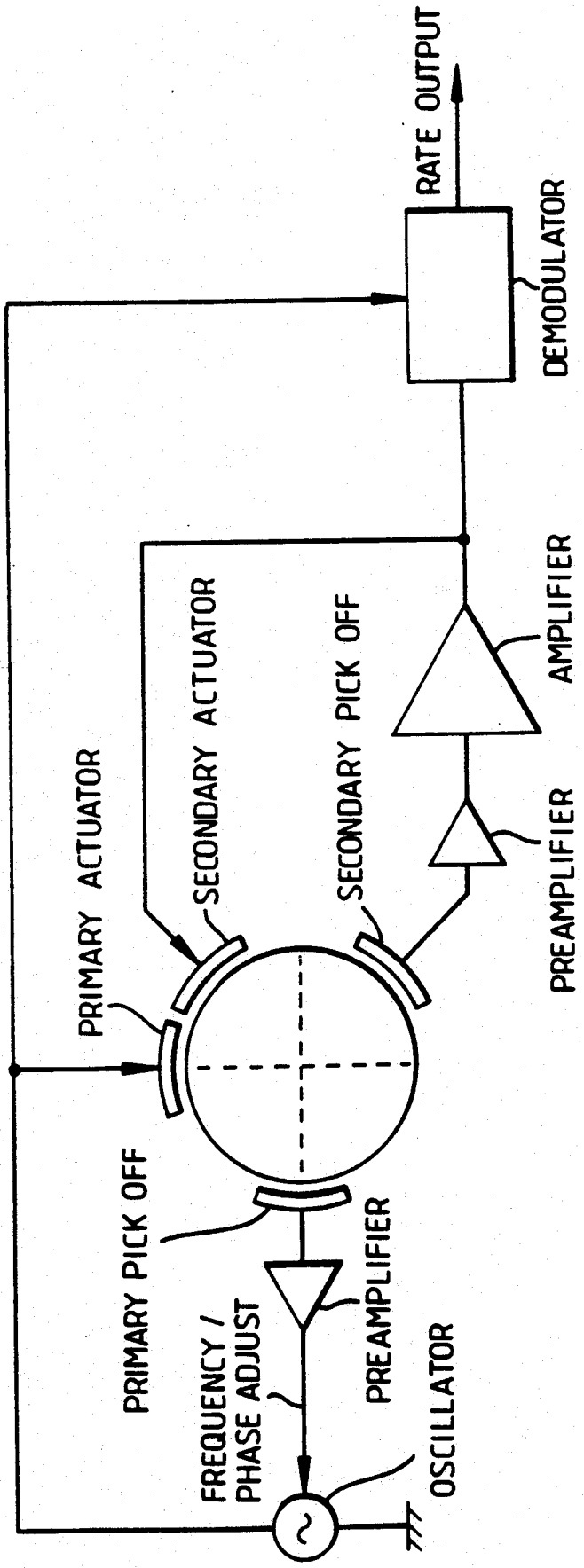
FIG. 3 is a diagram of a known sensor with improved linearity.
Figure 4:
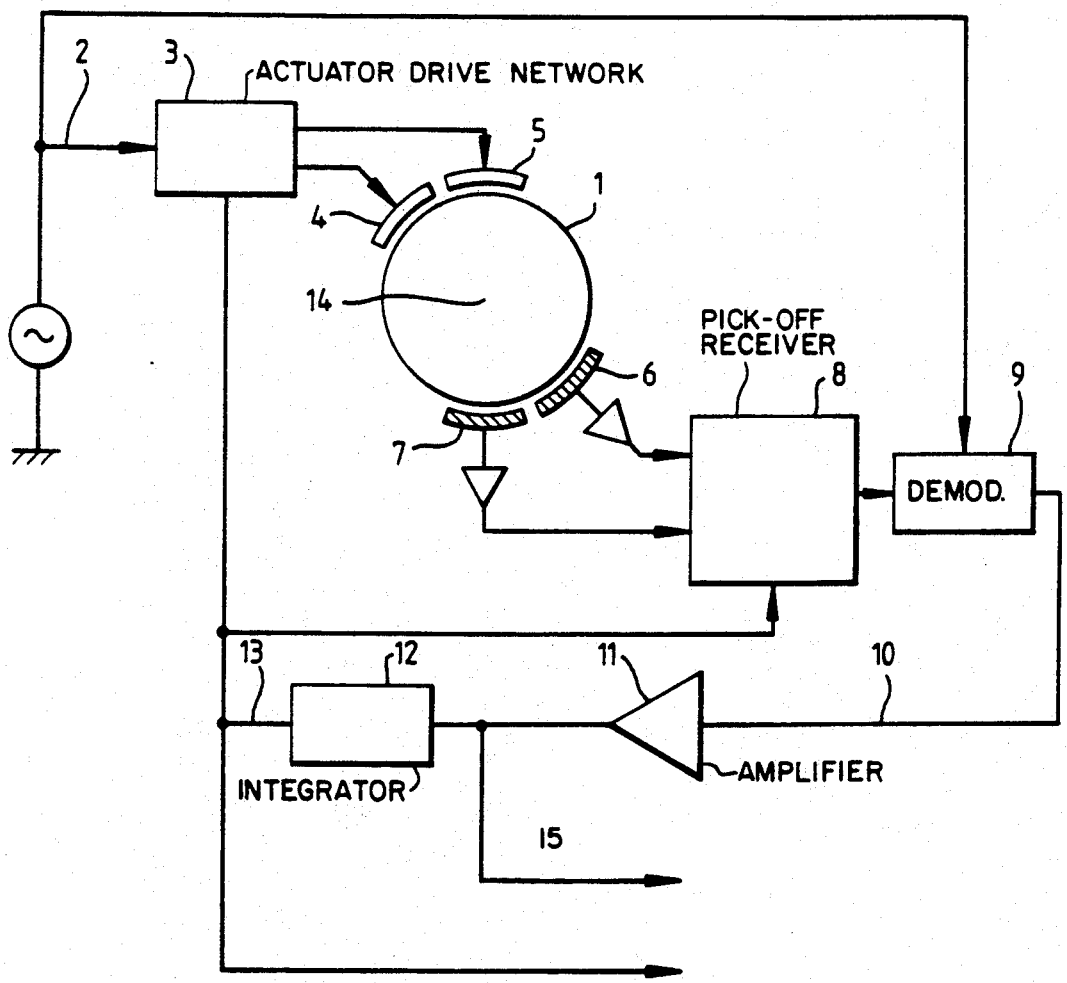
FIG. 4 is a simplified diagram of a single axis attitude sensor, according to the present invention.

Referring to FIG. 4, and by way of explanation, it will be assumed that the direction of the modes in an ideal cylinder remain fixed in inertial space when the cylinder is rotated; this assumption will be shown to be false in the following description.

In FIG. 4 an oscillating mode is set up in a resonating structure 1, by feeding an oscillator signal 2 through an actuator drive network 3 to two appropriately positioned actuators 4 and 5. The shape of the mode chosen must be such that a rotation of the mode in the inertial frame about its axis can be detected by combining the outputs from at least two appropriately positioned pick-offs 6 and 7 in pick-off receiver 8. The output of pick-off receiver 8 is demodulated with respect to the oscillator signal by demodulator 9. The output 10 of demodulator 9 is then amplified by amplifier and integrated by the integrator 12. The output 13 of the integrator is fed back to the actuator drive and the pick-off receiver in such a way as to keep the output of the demodulator nulled to zero. Thus in our assumed ideal system, the angle of the resonating mode will be held constant when the resonating structure is rotated about its axis 14. In such an ideal system, the output of the integrator is dependant upon the angle by which the resonating structure rotates about its axis, and the input to the integrator is dependant upon the rotation rate of the resonating structure about its axis. The outputs 13 and 15 respectively can be scaled and/or linearised as required. The type of linearisation required will be dependant upon the design of the actuator-drive network and pick-off receiver.

The feedback is arranged such that the oscillating mode maintains its spatial orientation when the resonating structure is rotated about its axis. It is this aspect of the invention which improves the scale factor accuracy of the rate output and reduces the errors in the angle output when the resonating structure is rotated about its axis. It should be noted that this principle holds for other modes of the structure and that these other modes may be adopted in appropriate circumstances.

This system, however, will not maintain the spatial orientation of the oscillating mode even for ideal cylinders. This is because even when the ideal cylinder (ie, symmetric and infinite Q (Q=Quality Function)) is rotated by an angle $\theta$, the mode actually rotates by an angle $K\theta$, where K is a constant of the order of typically around 0.3 to 0.8 and depends upon the shape of the mode that is excited in the structure. Thus the mode neither rotates with the cylinder, nor is left stationary in space proving the initially explanatory assumption false.

The FIG. 4 system will therefore maintain the spatial orientation of the mode aligned to the inertial angle $K\theta$. This is because it is this angle that keeps the output of the demodulation nulled to zero. K is a function of the shape of the mode, which in turn is related to the shape of the cylinder. Although the shape of the cylinder might change with temperature, the effects can be easily compensated.

The system shown in FIG. 4 will therefore require a gain change in order to scale the rate and angle outputs and thus remove the K dependance.

Figure 5:
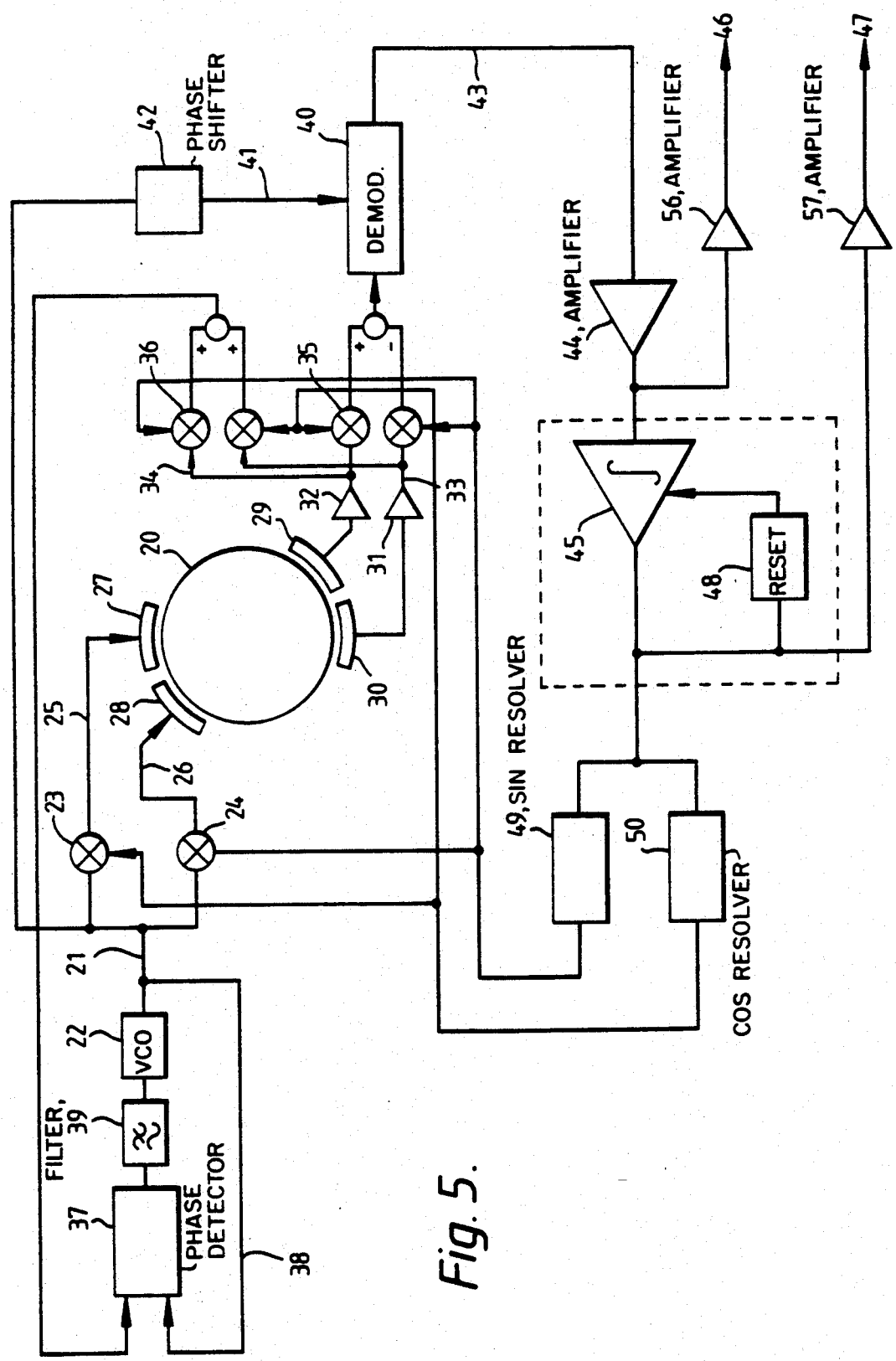
FIG. 5 is a diagram of a first preferred embodiment of the single axis attitude sensor according to the present invention.

Referring to FIG. 5 a closed-end cylinder 20 is operated as a single-axis attitude sensor (or rate integrating gyroscope). Feedback has been arranged such that if the output $\Phi$ of the integrator 45 is reset at time $t=0$, then the $\cos2\theta\cos\omega t$ mode is excited, where $\theta$ is in the inertial frame. This mode is excited irrespective of the rotation around the cylinder axis.

The system operates by multiplying the output 21 from a voltage controlled oscillator (VCO) 22 by $\cos\Phi$ in multiplier 23 and by $\sin\Phi$ in multiplier 24 respectively. Then the resulting signals 25 and 26 are fed to two actuators 27 and 28 respectively placed at approximately 45° with respect to each other. The pick-offs 29 and 30 are positioned diametrically opposite the actuators. The pick-off signals are amplified by two low noise pre-amplifiers 31 and 32 whose outputs 33 and 34 are connected to two sets of multipliers 35 and 36. The multiplier 35 multiplies signals 34 and 33 by $\cos\Phi$ and $\sin\Phi$ respectively, and multiplier set 36 multiplies signals 33 and 34 by $\cos\Phi$ and $\sin\Phi$ respectively. The signals from multiplier set 36 are added together and used as the input to a phase detector 37 whose reference signal 38 is obtained from the output of VCO 22. The output of the phase detector is filtered in filter 39 and used as the control for VCO 22. The phase detector 37, filter 39 and VCO 22 comprise a phase-locked loop whose purpose is to maintain the cylinder at resonance. In multiplier set 35 the outputs are subtracted and used as the input to a demodulator 40, whose reference signal 41 is obtained from a phase shifter 42, which phase shifts the output of VCO 22, such that the demodulator gain is maximised. The demodulated output 43 is passed through amplifier 44 and integrator 45 producing respectively rate output 46 and angle output 47 in a manner similar to that described above for the FIG. 4 system. If the integrator output is reset to zero at time $t=0$ and if there was no feedback, the output of the demodulator would be zero until the cylinder was rotated.

With feedback, the output of the demodulator is amplified and integrated to yield the angle $\Phi$. The integrator can be reset when $\Phi$ reaches modulo $2\pi$ by reset 48. If the integrator is implemented digitally then it can be made to reset automatically by means of an overflow. The integrator output is converted to $\sin\Phi$ and $\cos\Phi$ by sin resolver 49 and cos resolver 50 and it is these signals which are fed back to the multipliers 23, 24, 35 and 36. Rotation of the cylinder about its axis now causes an error signal to appear at output 43 of demodulator 40 which is amplified, integrated and fed back so as to maintain the mode direction aligned to $K\theta$. Outputs can be obtained from both integrator output and input, which in this scheme are linearly proportional to the angle rotated about the cylinder axis and the rotation rate about the cylinder axis respectively.

The advantages offered by the invention is that the scale factor is controlled within the loop. Thus the scale factor should be extremely accurate. The implications of this are that the device would be suitable for use as a single-axis attitude sensor or rate integrating gyroscope whose angular output error after a given time interval would not be dependant upon the rate of rotation of the device. In addition, it provides a means for stabilising the scale factor accuracy of a single-axis rate sensor.

The system described by the invention would still drift in a similar way to known sensors. Standard means to null the drifts would therefore be required, although the nulling signal will be a function of the relative angle of the mode to the cylinder in the present invention.

Figure 6:
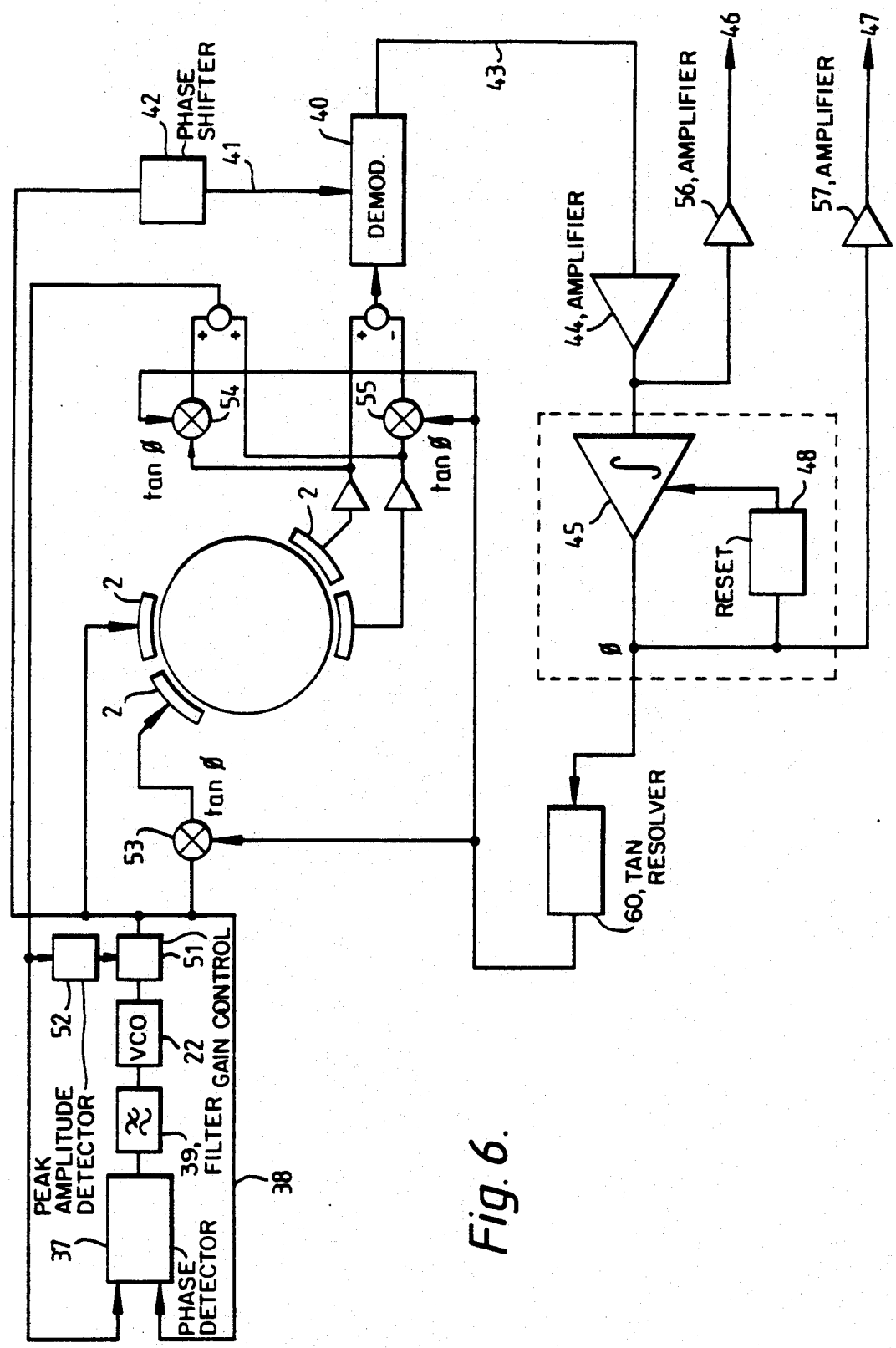
FIG. 6 is a diagram of an alternative embodiment of an attitude sensor, according to the present invention.

There are many variants of the above scheme which can provide simplifications in the electronics. One such scheme, is shown in FIG. 6, in which like reference numbers relate to like components. The scheme incorporates a gain control 51 in the primary loop to stabilise the primary loop amplitude which is controlled by peak amplitude detector 52. This loop can be used to eliminate the COS resolvers and to replace the SIN resolvers with TAN multipliers 53, 54 and 55, because the gain control loop linearises the system. The effect is to halve the number of multipliers being used, and also to remove the necessity of having to derive two transcendental functions.

A further simplification is to incorporate switches (not shown) which switch over at 45° of the resolver angle. The advantage here is that the output no longer has to go to infinity.

The above simplification can be adapted for other functions (for example a simple multiplication by the angle $\theta$) other than TAN provided that means are provided to linearise the angular output of the sensor.

Amplifiers 56 and 57 scale the outputs such that the true inertial angle and rate are output.

It should be noted that it would be possible to design an actuator drive network and pick-off receiver such that the direction of the oscillating mode was controlled. Where the mode changes shape, either as a function of time, or as a function of the relative angle of the mode to the case, this could be achieved, for example, by phase shifting one or more of the actuator signals, and by appropriate phase shifting in the pick-off receiver.

Similarly, it would be possible for a similar system to be designed such that the amplitude of the oscillating mode was varied either as a function of time, or as a function of the relative angle of the oscillating mode to the angle of the case.

It should also be noted that the integrator is not strictly necessary. Without the integrator, the amplifier output would be proportional to the relative angle and this output could be differentiated if required to provide a rate output. Such a system, although not technically perfect, may have sufficient accuracy if the gain of the amplifier is high enough. Similarly, a more complicated compensation network could be used in place of the integrator.

It should further be noted that it has been assumed that the resonating structure is at, or near, resonance. This could be achieved, for example, by combining the pick-off signals and feeding back to the oscillator in an analogous way as is currently used in the Coriolis rate sensors to hold the structure at resonance.

The resonating structure could be a cylinder, a disk, a hemisphere, or any shell-like (or even solid) structure in which modes with a spatial azimuthal degeneracy (or in practice near degeneracy) can be set up. Note that the factor K is generally different for each of these structures. In addition, if the shape of the mode varies according to the relative angle of the mode to the cylinder, then the scaling factor K may be a function of this relative angle. If this were the case, then the scaling would be altered accordingly.

In practice there will nonuniformities in the cylinder (or other resonators), which may or may not be deliberately incorporated into the structure. These nonuniformities will cause bias at the demodulator output. In such an event, it may desirable to use estimation techniques (such as Kalman Filters) to model the system to provide first-order correction. In addition, or alternatively, it may be desirable to measure the bias as a function of resolver drive angle, with the gyroscope open loop, then to digitise this bias, and store it in a memory such that it can be subtracted during intended sensor operation.

The actuators and pick-offs can be piezo-electric, magnetic, electrostatic, thermal resistive, thermal or any other types which can excite the structure into the desired resonance and provide the desired pick-off signals. Thus many known rate sensors could be used as the sensing element in this new single-axis attitude sensor.

We claim:

1. A solid-state attitude sensor comprising:
   a resonant body;
   at least two actuators coupled to the resonant body at a first predetermined set of positions which causes the resonant body to resonate at a predetermined angle relative to said at least two actuators;
   at least two pick-offs for producing a signal indicative of the resonance of the body; said pick-offs being positioned around the resonant body at a second predetermined set of positions;
   signal processing means for determining a rotation rate and attitude of the sensor from said signal; and
   feedback means for causing said actuators to vary said predetermined angle according to the rotation rate and attitude of the sensor.

2. A solid-state attitude sensor comprising:
   a resonant cylinder;
   at least two actuators coupled to the resonant cylinder;
   drive means for driving the at least two actuators to resonate the resonant cylinder;
   pick-off means coupled to the resonant cylinder for producing an electrical signal indicative of the resonant behavior of the resonant cylinder;
   signal processing means for controlling the resonant behavior of the resonant cylinder; said signal processing means comprising:
   demodulating means for producing a demodulated signal indicative of a rotation rate and thus a change in attitude of said sensor based on said electrical signal;
   amplifying means for amplifying said demodulated signal; and
   integrating means for determining an attitude of the sensor and for regulating the drive means based on said amplified demodulated signal.

3. A solid-state attitude sensor comprising:
   a resonant body;
   at least a first and second actuator coupled to the resonant body at a first predetermined set of positions which causes the resonant body to resonate at a predetermined angle relative to the first and second actuators;
   at least a first and second pick-off for producing first and second pick-off signals indicative of the resonance of the resonant a body; the first and second pick-offs being positioned around the resonant body at a second predetermined set of positions;
   signal processing means for determining a rotation rate of the sensor from the first and second pick-off signals; and
   feedback means for causing the first and second actuators to vary the predetermined angle according to the rotation rate of the sensor, the feedback means maintaining orientation of the resonance of the resonant body at an angle of $K\theta$, where K is a constant dependent on a shape of the resonant shape and a mode of resonance excited, and $\theta$ represents the attitude of the sensor.

4. A solid-state attitude sensor as in claim 3, further comprising a gain change means for scaling the rotation rate determined by the signal processing means.

5. A solid-state attitude sensor as in claim 3, wherein the resonant body comprises one of a cylinder and a ring.

6. A solid-state attitude sensor as in claim 4, wherein the resonant body comprises one of a cylinder and a ring.

7. A solid-state attitude sensor as in claim 3, wherein the signal processing means includes:
a demodulating means for producing a demodulated signal representative of the rotation rate from the first and second pick-off signals;
an amplifying means for amplifying the demodulated signal to obtain the rotation rate of the sensor; and
integrating means for integrating output from the amplifying means to determine the attitude of the sensor.

8. A solid-state attitude sensor as in claim 4, wherein the signal processing means includes:
a demodulating means for producing a demodulated signal representative of the rotation rate from the first and second pick-off signals;
an amplifying means for amplifying the demodulated signal to obtain the rotation rate of the sensor; and
integrating means for integrating output from the amplifying means to determine the attitude of the sensor.

9. A solid-state attitude sensor as in claim 5, wherein the signal processing means includes:
a demodulating means for producing a demodulated signal representative of the rotation rate from the first and second pick-off signals;
an amplifying means for amplifying the demodulated signal to obtain the rotation rate of the sensor; and
integrating means for integrating output from the amplifying means to determine the attitude of the sensor.

10. A solid-state attitude sensor as in claim 7, wherein the signal processing means further includes reset means for resetting an output of the integrating means to zero at time $t=0$ in order to excite a $\cos2\theta \cos\omega t$ mode of resonance in the resonant body.

11. A solid-state attitude sensor as in claim 3, further comprising:
a voltage controlled oscillator for driving the first and second actuators;
first multiplying means for multiplying an output of the voltage controlled oscillator by $\cos\theta$ and $\sin\theta$, respectively, for application to the first and second actuators, respectively,
wherein said signal processing means includes preamplifier means for receiving and amplifying the first and second pick-off signals to produce first and second amplified pick-off signals, a second multiplying means for multiplying the first and second amplified pick-off signals by $\sin\theta$ and $\cos\theta$, and third multiplying means for multiplying the first and second amplified pick-off signals by $\cos\theta$ and $\sin\theta$;
phase detector means for producing a control signal to control the voltage controlled oscillator based on output from the voltage controlled oscillator and the second multiplying means; and
filter means for filtering the control signal for application to the voltage controlled oscillator such that the resonant body is maintained at resonance.

12. A solid-state attitude sensor as in claim 11, wherein said signal processing means further includes:
a phase shifting means for phase shifting an output of the voltage controlled oscillator;
a demodulating means for demodulating the output from the third multiplying means to produce a demodulated signal representative of the rotation rate and attitude of the sensor, the demodulating means using output from the phase shifting means as a reference signal to maximize a gain of the demodulating means.

13. A solid-state attitude sensor as in claim 12, wherein said signal processing means further includes:
an amplifier for amplifying the demodulated signal to obtain the rotation rate of the sensor, and an integrator for integrating output of the amplifier to obtain the attitude of the sensor.

14. A solid-state attitude sensor as in claim 3, further comprising:
a voltage controlled oscillator for driving the first and second actuators;
gain control means for receiving and stabilizing output from the voltage controlled oscillator for application to the first actuator;
first multiplying means for multiplying an output of the gain control means by $\tan\theta$ for application to the second actuator;
wherein said signal processing means includes preamplifier means for receiving and amplifying the first and second pick-off signals to produce first and second amplified pick-off signals, and a second multiplying means for multiplying the first and second amplified pick-off signals by $\tan\theta$ to produce first and second multiplied signals, respectively;
combining means for first combining the first amplified pick-off signal with the second multiplied signal and for second combining the second amplified pick-off signal with the first multiplied signal;
phase detector means for producing a control signal to control the voltage controlled oscillator based on output from the voltage controlled oscillator and the second combination; and
filter means for filtering the control signal for application to the voltage controlled oscillator.

15. A solid-state attitude sensor as in claim 14, wherein said signal processing means further includes:
a phase shifting means for phase shifting an output of the voltage controlled oscillator;
a demodulating means for demodulating the first combination to produce a demodulated signal representative of the rotation rate and attitude of the sensor, the demodulating means using output from the phase shifting means as a reference signal to maximize a gain of the demodulating means.

16. A solid-state attitude sensor as in claim 15, wherein said signal processing means further includes:
an amplifier for amplifying the demodulated signal to obtain the rotation rate of the sensor, and an integrator for integrating output of the amplifier to obtain the attitude of the sensor.

17. A solid-state attitude sensor as in claim 13, further comprising converter means for converting output from the integrator to $\sin\theta$ and $\cos\theta$ respectively for output to the first multiplying means.

18. A solid state attitude sensor as in claim 16, further comprising converter means for converting output from the integrator to $\tan\theta$ respectively for output to the first multiplying means.

19. A solid-state attitude sensor as in claim 3, further comprising:
- an oscillator means for driving the first and second actuators;
- first multiplying means for multiplying an output of the voltage controlled oscillator by $\cos\theta$ and $\sin\theta$, respectively, for application to the first and second actuators, respectively,
- wherein said signal processing means includes preamplifier means for receiving and amplifying the first and second pick-off signals to produce first and second amplified pick-off signals, a second multiplying means for multiplying the first and second amplified pick-off signals by $\sin\theta$ and $\cos\theta$, and third multiplying means for multiplying the first and second amplified pick-off signals by $\cos\theta$ and $\sin\theta$;
- phase detector means for producing a control signal to control the voltage controlled oscillator based on output from the voltage controlled oscillator and the second multiplying means; and
- filter means for filtering the control signal for application to the voltage controlled oscillator such that the resonant body is maintained at resonance.

* * * * *